United States Patent Office 2,698,411
Patented Dec. 28, 1954

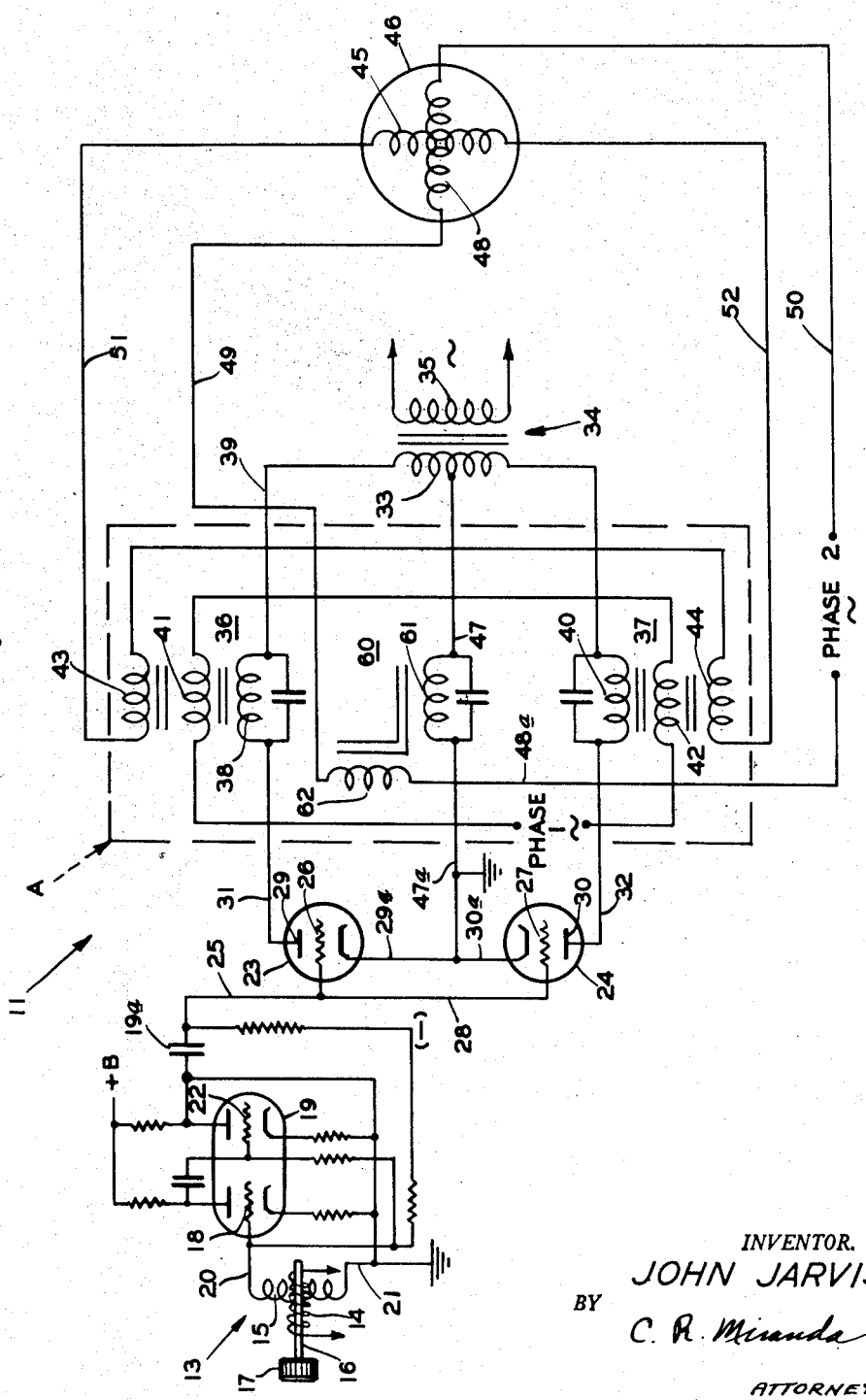

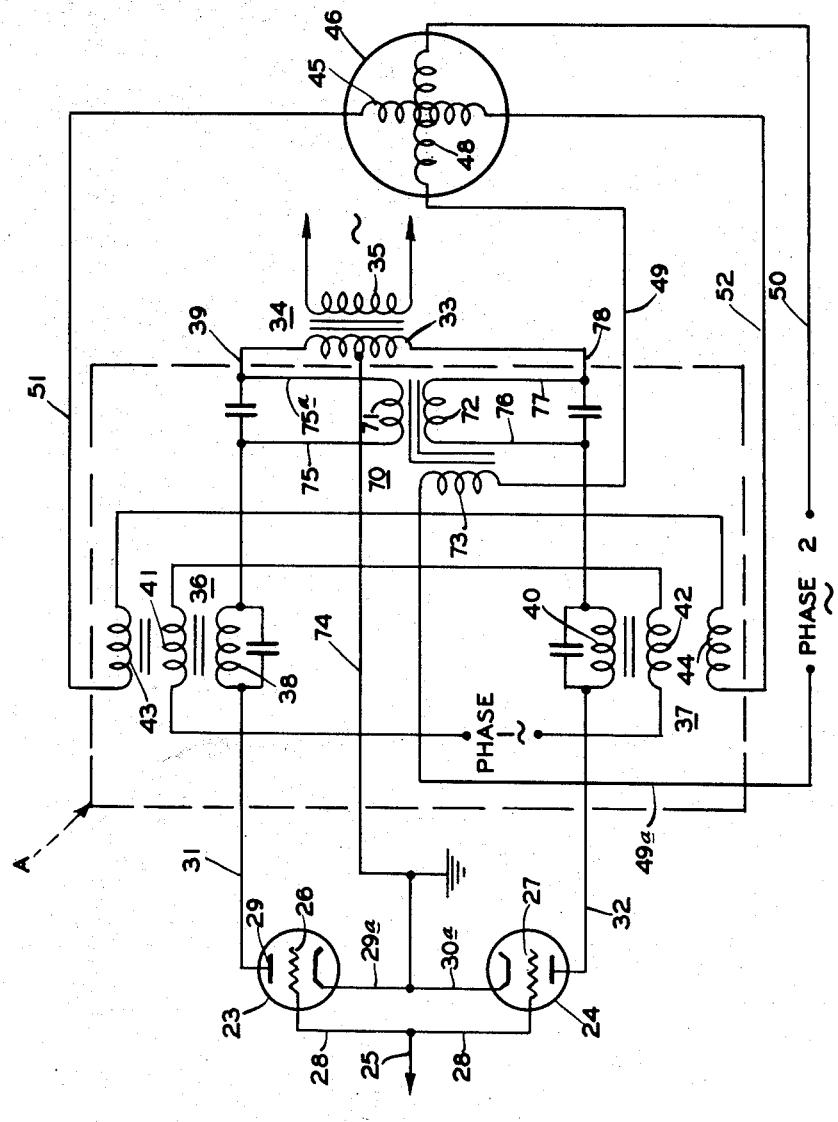

2,698,411

MOTOR CONTROL SYSTEM

John Jarvis, Dumont, N. J., assignor to Bendix Aviation Corporation, Teterboro, N. J., a corporation of Delaware Application December 30, 1950, Serial No. 203,734

3 Claims. (Cl. 318—229)

This invention relates to motor control systems and more particularly to a control circuit for controlling the power to a polyphase motor.

Systems employing polyphase motors and particularly two phase motors controlled as to the amount of displacement and direction of displacement and wherein a pair of windings are utilized to accomplish the latter, have been subject to inherent difficulties inasmuch as heat losses are encountered when the motor is idle. In this type of motor a variable phase field winding and a fixed phase field winding energized from a two phase power source of alternating current are employed. The variable field winding receives a command signal or voltage to drive the motor in a direction and an amount determined by the phase as well as the magnitude of the signal received. However, when there is no demand on the variable field winding and it is accordingly unenergized the fixed field winding still remains energized, thereby resulting in undesirable heat losses and wasted power in the motor.

The present invention contemplates a motor control circuit wherein a two phase induction motor having a fixed and variable phase winding drives a given load in a direction and an amount determined by the phase and the magnitude of a control signal voltage developed in response to a controlling condition. The signal is discriminated by an electronic circuit which produces a current flow in the variable field winding in a direction determined by the phase of the signal. A magnetic amplifier is included between the electronic circuit and motor and is inductively associated with the two phase power source of the motor. Connected in the magnetic amplifier is an inductor leg which cuts off power to the fixed phase of the motor in the absence of a control signal. A pair of transformers are also included in the magnetic amplifier and comprise saturable transformers each having a saturating winding which controls the induction of a voltage in a secondary winding by a primary winding connected to the variable phase power source.

An object of the present invention, therefore, is to provide a novel and improved motor control circuit for controlling power to a polyphase motor.

Another object of the present invention is to provide a two phase motor responsive to a control signal voltage, to effect driving thereof in a direction and an amount determined by the phase and the magnitude of the signal, and includes novel means for preventing heat losses in the motor in the absence of the signal.

A further object is to provide a novel motor control circuit wherein an electronic means discriminates a control signal voltage to drive a two phase motor in a direction and an amount determined by the phase and the magnitude of the signal. A magnetic amplifier, connected to the electronic circuit and the motor, includes inductor means connected in the fixed phase of motor to prevent energization of the fixed field motor winding in the absence of the control signal.

Another object is to provide novel control means for a polyphase motor wherein both the variable and the fixed phase windings of the motor are energized in response to a command signal, energization of the fixed phase being a function of the signal, and wherein as the command signal drops to zero the fixed phase winding is automatically de-energized.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

In the drawings wherein like reference numerals refer to like parts,

Fig. 1 is a schematic diagram of one embodiment of the instant invention as embodied in a novel motor control circuit, and Fig. 2 is a schematic diagram of a second embodiment of the instant invention as employed in the motor control circuit of Fig. 1.

Referring now to the drawings for a more detailed description of the present invention, the latter is embodied in a control circuit (Figure 1), generally designated with the reference character 11, which is interposed between a relatively weak signal developing device 13 and a controlled motor 46. Signal device 13 comprises a rotor winding 14, energized from a suitable source of alternating current, and a single phase stator winding 15 inductively associated with the winding 14. Rotor winding 14 is located on and movable with a shaft 16 which may be displaced angularly by a knob 17. Rotation of shaft 16 induces a signal voltage in stator winding 15, as is well understood by those skilled in the art, which is proportional to the amount of displacement of rotor winding 14 from the position as seen in Fig. 1.

The phase of the induced signal is determined by the direction of displacement of rotor winding 14 from the null position shown in Fig. 1. It may be readily understood that any other type of device which develops an alternating voltage may be employed in place of device 13, the main consideration being that the signal must be of reversible phase. The signal induced in winding 15 is fed to the control grid 18 of a twin triode amplifying tube 19 having two stage amplification, by conductors 20 and 21. Plate potential of the tube 19 is supplied from a positive D. C. (+B) source while the grids 18 and 22 are supplied with a negative potential. The induced control signal is amplified by tube 19 to emerge as a pulsating D. C., and changed to an A. C. voltage by a condenser 19a, which is transmitted to a pair of tubes 23 and 24 by way of a conductor 25. Control grids 26 and 27 of tubes 23 and 24 respectively are connected by a common lead 28 to the conductor 25. The purpose of tubes 23 and 24 is to discriminate the phase of the control signal, the direction and magnitude of which depend upon the amount and direction that rotor winding 14 is displaced from a normal position relative to stator winding 15. Plates 29, 30 of tubes 23, 24 respectively are connected by way of conductors 31, 32 with a split secondary winding 33 of a plate transformer 34 whose primary winding 35 is supplied by a suitable source of alternating current. The plate voltages of tubes 23, 24 are supplied by plate transformer 35 in such a manner that plate current will flow through one or the other of the tubes depending upon the phase of the grid supply voltage. At the same time, the magnitude of this plate current is dependent upon the magnitude of the amplified control signal as impressed on the grids as grid supply voltage. A magnetic amplifier bearing the designation "A" and shown enclosed in broken lines contains saturable transformers 36 and 37. Transformer 36 comprises a soft iron core having a saturating winding 38 which is connected in the plate circuit of tube 23 by conductors 31 and 39, while transformer 37 has a similar saturating winding 40 connected in the plate circuit of tube 24. Each transformer employs primary windings, shown as 41 and 42, which are connected in series aiding relation to a source of alternating current, known hereinafter as the variable power phase or Phase 1. Furthermore, each transformer is provided with secondary windings, shown as 43, 44 which are connected in series, opposed relation and form a closed circuit with the variable field winding 45 of the two-phase reversible induction motor 46. A pair of leads 47 and 47a connect the mid-point of secondary winding 33 with the junction of leads 29a and 30a leading to the cathodes of tubes 23, 24, to form a portion of the plate circuits of the above-mentioned tubes.

Motor 46 has a fixed phase field winding 48 which is energized by an A. C. power source designated in Fig. 1 as Phase 2, by conductors 49, 50. The operation of the saturable transformers 36, 37 may now be set forth in order to more clearly understand their function in the circuit shown in Figure 1. When no current flows through either of tubes 23, 24 due to the absence of a control signal at device 13, the two voltages induced in transformer secondaries 43, 44 are equal inasmuch as the transformers are balanced. Because they are connected in series opposition, the two induced voltages are opposite in phase. Since the two equal voltages opposing each other are in the same circuit there is no resultant current flow. If current flows from either of the two tubes 23, 24 the saturating winding connected with the conducting tube is energized to magnetically saturate the magnetic core of the transformer to which it is connected, thereby cutting down the induction in the secondary of the transformer correspondingly. Therefore, the voltage induced in the secondary of the unsaturated transformer is greater causing current to flow in the variable field of the motor 46. The phase of the current flow depends upon which saturating winding is energized.

Coming now to the operation of the control circuit 11 thus far described, when the rotor winding 14 is in a normal or null position no control signal is induced in stator winding 15 by rotor winding 14. At this time the signals at both grids 26 and 27 are zero so that the network is balanced and the current at output leads 51 and 52 of secondaries 43 and 44 is zero because the secondaries are in series opposed relation so that the induced voltage in secondary 43 balances the induced voltage in secondary 44. If the shaft 16 is displaced by knob 17 in one direction, the directional signal induced in stator winding 15 and amplified by tube 19 will be of such a nature that when communicated to grids 26, 27 of tubes 23, 24 it will pass from a zero to a positive maximum value. At that instant, current at plate 29 of tube 23 passes from a zero to a positive maximum value. If this be true, then the current at plate 30 of tube 24 will be passing from a zero to a negative maximum value so that no current flows in lead 32. Current however, of a pulsating nature will flow within lead 31 and therefore within saturating winding 38. As a result of such current flow, the core of reactor 36 will become saturated so that currents induced in secondary 43 will be decreased in value causing an unbalance in the network thereby producing a current flow in leads 52, 51.

If shaft 16 is displaced in a direction opposed to that hereinbefore considered, the directional signal imposed on grids 26, 27 will be of such a nature that it will pass from a zero to a maximum value so that no current will flow at plate 29 but will flow at plate 30 and within lead 32. In this event, the core of transformer 37 will become saturated thereby decreasing the voltages induced within the secondary 44 and the network will again become unbalanced whereby current will flow in leads 52, 51 in an opposed direction. The foregoing constitutes a discrimination feature which determines the direction of the rotation of motor 46.

Coming now to the novel features of the instant invention, an inductor 60 is connected in the magnetic amplifier A and comprises a soft iron core having wound thereon an energizing winding 61 connected by lead 47 to the secondary 33 of plate transformer 34 and to the cathodes of tubes 23 and 24. Inductor 60 also includes an inductor winding 62 connected by conductor 48a to the power source, Phase 2, and to motor winding 48 by conductor 49. Inductor 60 by reason of its connection in the magnetic amplifier network functions to carry the sum of the current flow through the plate circuits of tubes 23 and 24. Normally, the impedance of coil 62 is very high so as to effectively prevent current flow therethrough. Upon energization of coil 61 however, the magnetic flux produced by coil 61 saturates the core of transformer 60 to decrease the impedance of coil 62 thereby permitting current to flow. If the rotor winding 14 of the signal developing device 13 is in a null position, no voltage is induced and therefore both tubes 23 and 24 remain non-conducting. In this event, no current flows in the plate circuits of the tubes and accordingly, the network is balanced so that coil 61 remains unenergized. Because the coil 61 is unenergized, coil 62 has a high impedance and operates to block or cut off any current to the fixed phase power winding 48 of motor 46 from the power source, Phase 2. In effect, the inductor 60 acts as an inductive cut-off switch or relay which prevents energization of the fixed winding 48 when no control signal is developed. Accordingly, heat losses are prevented and power is not wasted in the motor when there is no demand made thereon. As explained previously, the variable winding 45 also remains de-energized because of the opposed and balanced voltages at secondaries 43 and 44. It may be readily understood that the inclusion of inductor 60 greatly increases the efficiency of the system in controlling the power to motor 46 from Phase 2 of the power source as a function of the control signal developed. If a control signal of a certain magnitude is developed, the impedance of coil 62 is decreased proportionally to allow a certain amount of power to be communicated to the motor. For example, if the signal developed is of a phase to make tube 23 conductive then a current flow is created in the plate circuit thereof and may be traced thusly: Plate 29, cathode of tube 23, lead 29a, conductor 47a, winding 61, conductor 47, upper half of secondary 33, conductor 39, saturating winding 38 and conductor 31. Since the current flow through the plate circuit of tube 24 is zero at this time, the current through coil 61 is directly proportional to the control signal. When tube 24 is conducting, a current flow is produced in its respective plate circuit which may be traced through: Plate 30, cathode of tube 24, lead 30a, conductor 47a, coil 61, conductor 47, lower half of secondary 33, coil 40 and conductor 32. In this case, since the current in the plate circuit of tube 23 is zero, then the current through coil 61 and the impedance of coil 62 are proportional to the induced signal from stator winding 15. It is also apparent in the mentioned cases that coil 61 carries the sum of the currents in both plate circuits when a control signal exists. From the foregoing, it may be understood that motor 46 is driven in a direction determined by the phase of the signal induced in stator winding 15 and is displaced an amount depending upon the magnitude of the induced signal.

A second embodiment of the instant invention is shown in Fig. 2 wherein like elements in Fig. 1 have like numerals in Fig. 2, and, only the pertinent portions of the motor control circuit 11 necessary to an understanding of the invention are shown. The signal developing device 13 and twin amplifier tube 19 have been omitted in Fig. 2 for purposes of clarity. In this embodiment of the invention, a differential control coil assembly or inductor 70 is substituted for inductor 60 and is also added to the magnetic amplifier "A." Inductor 70 consists of a soft iron core having a pair of saturating windings 71, 72 and an inductor winding 73. Saturating winding 71 is connected by conductors 75 and 75a in series with control winding 38 while winding 72 is connected by conductors 76 and 77 in series with control winding 40. The inductor winding 73 is connected by conductors 49 and 49a to the power source Phase 2 and motor winding 48. It is to be noted that in this embodiment neither of the saturating windings 71 and 72 are connected in the path connecting the mid-point of secondary 33 of transformer 35 and the cathodes of tubes 23 and 24.

The second embodiment (Fig. 2) of the invention may be considered as a slight improvement over the first embodiment (Fig. 1) because in practical applications a small leakage occurs at the plates of tubes 23 and 24 of the latter embodiment of the invention which resulted in a slight decrease of impedance of coil 62 when no control signal appeared at the tubes. This has been overcome by the use of inductor 70 in place of inductor 60 in the motor control circuit. The saturating winding 72 is wound on the core of inductor 70 identical with winding 71 and is connected in such a manner that the magnetic effect caused by coil 71 is opposed by that caused by coil 72. In other words, the net magnetic effect is the difference of the plate currents of tubes 23 and 24. It is also apparent that upon initiation of a control signal a single tube and a single saturating winding is energized to produce a magnetic flux which is unopposed by a magnetic flux from the other winding, inasmuch as the latter winding remains unenergized due to the lack of plate current in the unenergized tube. Following the operation of this second embodiment, when the input signal on grids 26 and 27 of tubes 23 and 24 from winding 15 is zero, theoretically, no plate current should be produced. However, since in practical use a small plate current does exist, current flows from plate 29, cathode of tube 23, conductor 29a, a conductor 74, upper half of secondary 33, conductor 39, conductor 75a, winding 71, conductor 75, saturating coil 38, and conductor 31. Plate current also exists in tube 24, from plate 30, cathode of tube 24, cathode connection 30a, conductor 74, lower half of secondary 33, conductors 78 and 77, winding 72, lead 76, saturating coil 40 and conductor 32. Since the coils 71 and 72 are wound in the manner heretofore indicated the magnetic flux produced by coil 71 opposes the magnetic flux produced by coil 72 to effect a magnetic flux which is the difference of the currents flowing from the discriminator tubes. This net magnetic flux saturates the core of inductor 70 to energize winding 73, thereby decreasing the impedance of the winding proportional to the magnitude of the net magnetic flux. In any event, it does not matter how large the plate leakages may become, because the impedance of coil 73 will be reduced slightly or remain substantially at full impedance due to partial saturation of the core by the net magnetic flux to prevent an appreciable amount of power from being supplied to the motor 46 by power source Phase 2. In this manner, heat losses and wasted power are avoided. The employment of this embodiment does not affect the operation of the system since the plate load of the conducting discriminator tube is the same.

The operation of the variable phase of the motor circuit in this embodiment is identical with the operation of the variable phase of the first embodiment and therefore it need not be set forth again. In the operation of the fixed phase of the motor as arranged in the second embodiment, the energization of either saturating coil 71 or 72 is determined by the phase of the input to tubes 23 and 24. This input will produce a plate current flow through the conducting tube to saturate its related winding on inductor 70 to decrease the impedance of coil 73 whereby power is presented to the fixed winding 48 from power source Phase 2. Inasmuch as conduction of one tube produces plate current in that tube, no plate current flows in the other plate circuit and therefore the saturating winding associated with the latter plate circuit is not energized to produce a magnetic flux. Because of this, the magnetic flux of only one winding exists and the impedance of inductor coil 73 is reduced proportional to the magnitude of the induced signal from stator winding 15.

It is apparent from the foregoing, that the instant invention provides novel and effective means for preventing heat losses and wasted power when the motor is idle. The present invention also provides a motor control circuit wherein a reversible two phase induction motor is subjected to immediate demands made upon it to be driven in a direction determined by the phase of an induced control signal and is displaced angularly an amount depending upon the magnitude of the induced signal.

The present invention has many practical applications, and it is readily evident that it may be embodied in any system wherein a reversible two phase motor is subject to a controlling condition to effect a correspondingly controlled result. It also may be used to control the speed and direction of a motor output shaft by a controlling signal effected through automatic or manual means. The invention readily finds application in servo systems employed in automatic and manual aircraft control systems and positional control systems.

Although two embodiments of the invention have been illustrated and described in detail, it is to be expressly understood that the invention is not limited thereto. Various changes may be made in the design and arrangement of the parts without departing from the spirit and scope of the invention as will now be understood by those skilled in the art.

1. A control system for a motor having a fixed phase winding connected for energization by an alternating current source and a variable phase winding responsive to a control signal for driving the motor, comprising an amplifier having a pair of electronic tubes connected to receive said signal and selectively energized thereby and having output plate circuits, electrical differential means comprising a pair of windings connected in the plate circuits of said tubes, the winding in the plate circuit of one tube being arranged in such a manner with the winding in the plate circuit of the other tube that flow of plate current in each tube produces opposed magnetic fluxes in the windings to effect a net magnetic flux, and a third winding inductively coupled with said pair of windings and connected to the fixed phase winding, said third winding having a variable impedance characteristic the value of which varies inversely proportional to the net magnetic flux.

2. In a control system for a motor having a fixed phase winding adapted to be energized by an alternating current source and a variable phase winding adapted to be energized in response to a control signal for driving said motor, a pair of electronic tubes each having an input connected to receive the control signal and selectively energized thereby and each having an output plate circuit, an amplifier having an input connected to the plate circuits of said tubes and having an output connected to said variable phase winding for energizing the latter upon energization of one or the other of said tubes, variable impedance means normally having a high impedance characteristic connected to said fixed phase winding for preventing energization thereof by said source upon deenergization of said variable phase winding, and a pair of control windings connected in the plate circuits of said tubes and inductively coupled with said impedance means for changing the value of said impedance means as a function of the output of said tubes whereby the fixed phase winding of said motor becomes energized as a function of the output of said tubes.

3. In a control system for a motor having a fixed phase winding adapted to be energized by an alternating current source and a variable phase winding adapted to be energized in response to a control signal for driving said motor, a pair of electronic tubes each having an input for receiving the control signal and adapted to be selectively energized thereby and each having an output plate circuit, said tubes having leakage current in their plate circuits when both said tubes are deenergized, means connected to said variable phase winding and operable by the output of said tubes for energizing said last mentioned winding, impedance means connected to said fixed phase winding for preventing energization thereof by said source when said variable phase winding is deenergized, and a pair of windings connected in the plate circuits of said tubes and inductively coupled with said impedance means, said pair of windings being arranged to produce opposed magnetic fluxes to effect a net magnetic flux which decreases the value of the impedance means upon energization of one or the other of said tubes to provide for operation of said motor, and said net magnetic flux being ineffective to reduce the value of said impedance means when both said tubes are deenergized.

References Cited in the file of this patent

UNITED STATES PATENTS

| Number | Name | Date |
|---|---|---|
| 2,411,608 | Lesnick | Nov. 26, 1946 |
| 2,435,926 | Krupick | Feb. 10, 1948 |
| 2,489,637 | Hand | Nov. 29, 1949 |
| 2,546,271 | McKenney et al. | Mar. 27, 1951 |
| 2,559,513 | Palmer | July 3, 1951 |
| 2,584,866 | Gray | Feb. 5, 1952 |

FOREIGN PATENTS

| Number | Country | Date |
|---|---|---|
| 617,704 | Great Britain | Feb. 10, 1949 |